United States Patent [19]

Junginger et al.

[11] 4,231,019

[45] Oct. 28, 1980

[54] REMOTE CONTROL ARRANGEMENT FOR A MEDICAL APPLIANCE

[75] Inventors: Klaus M. Junginger, Rastatt; Hermann Kieferle, Karlsruhe, both of Fed. Rep. of Germany

[73] Assignee: Stierlen-Maquet Aktiengesellschaft, Fed. Rep. of Germany

[21] Appl. No.: 936,065

[22] Filed: Aug. 23, 1978

[30] Foreign Application Priority Data

Aug. 24, 1977 [DE] Fed. Rep. of Germany ....... 2738155

[51] Int. Cl.[2] ....... H04Q 3/00

[52] U.S. Cl. ....... 340/171 R; 340/171 PF; 340/171 A; 358/194.1

[58] Field of Search ....... 340/171 R, 171 PF, 171 A; 358/194

[56] References Cited

U.S. PATENT DOCUMENTS

| | | | |
|---|---|---|---|
| 3,060,408 | 10/1962 | Stewart | 340/171 PF |
| 3,869,671 | 3/1975 | Schroder | 358/194 |

*Primary Examiner*—Harold I. Pitts

*Attorney, Agent, or Firm*—Lerner, David, Littenberg & Samuel

[57] ABSTRACT

In a remote control arrangement for a medical appliance, a transmitter and a receiver are provided. The transmitter has a frequency generator controllable by means of code words which generate frequency signals and a group frequency signal alternately. In order to improve the freedom from interference and ease of changing the frequency of the group frequency signal, the frequency generator is constructed to generate a plurality of additional group frequency signals as a function of the feeding one at a time of a corresponding number of different group code words. An impulse generator of the transmitter has two complementary outputs, and the inputs of the frequency generator are connected each through a diode to an output of the impulse generator so that in a prescribed switching state of the impulse generator the potentials corresponding to the binary values appearing at its outputs are connectable to the inputs of the frequency generator through all the diodes poled in the passage direction with reference to the respective potential corresponding to the respective bits of a prescribed group code word.

11 Claims, 3 Drawing Figures

REMOTE CONTROL ARRANGEMENT FOR A MEDICAL APPLIANCE

FIELD OF THE INVENTION

The invention relates to a remote control arrangement for controlling a medical appliance comprising a transmitter and a receiver associated with at least one appliance.

BACKGROUND OF THE INVENTION

An arrangement for remotely controlling an operating table is known which comprises a mobile transmitter and a receiver associated with the operating table, wherein the transmitter has a number of feed-in keys, corresponding to the number of functions of the operating table to be controlled. Said feed-in keys are combined physically to form a feed-in keyboard for feeding-in binary command signals associated with the functions in a 1-of-n code. A frequency generator controllable as to its frequency has a plurality of outputs. By feeding-in a code word corresponding to the respective command signal, and switchable on as a function of the presence of a command signal, the frequency generator outputs are controlled. A transmission converter is fed by the frequency generator and transmits frequency signals corresponding to the command signals. A receiver has a reception converter and means for selective amplification of the frequency signals received and for their reconversion into the command signals. In this case, by the actuation of a feed-in key, the frequency generator is constructed as a free-swinging oscillator and is connected to a capacitor, while the capacitors which can be switched on by means of different keys exhibit different values so that a different frequency is associated with each feed-in key. With this arrangement, due to the necessary build-up processes and to the echo effects which occur, an accurate evaluation of the frequency impulses transmitted as to their duration is impossible. Furthermore, the arrangement is very highly sensitive to interference. But, particularly in hospitals, where remote control arrangements for medical appliances are frequently used, there exists a large number of such interference sources. For example, if the ultrasonic range is chosen for the transmission of the frequency signals, then interference signals may originate from ultrasonic washing machines for instruments, ultrasonically operated surgical hand washing installations, high-frequency surgical appliances, ultrasonic diagnostic appliances or ultrasonic bone welding appliances. Experience also shows that ultrasonic components occur in many resonance phenomena, e.g., in wind noises in flue ducts or in telephone installations. The susceptibility to interference is particularly serious when, e.g., in a hospital with a plurality of operating theaters, the respective operating tables are required to be operated by means of similar remote control arrangements, so that each of these arrangements then acts as an interference transmitter for at least the remote control arrangements used in the adjacent rooms.

A remote control arrangement similar to the aforementioned type is also known for television receiving sets, wherein the frequency generator is constructed to generate a group frequency signal in addition to the frequency signals corresponding to the command signals as a function of the feeding-in of an additional group code word. The transmitter has an impulse generator which can be set in action as a function of the presence of a command signal. The output impulses generated by the impulse generator are a function of the group code word fed into the frequency generator instead of the code word corresponding to the respective command signal. The receiver has a circuit which controls the emission of the command signals from the alternate reception of a frequency signal corresponding to the command signal and the group frequency signal. Since in this case the command signals become effective in the controlled appliance only when a frequency corresponding to the command signal and the group frequency are received alternately, the freedom from interference is considerably improved. However, any use of such a remote control arrangement for controlling medical appliances is generally made impossible by the fact that the group frequency is fixedly prescribed and cannot be modified without extensive structural modifications to the transmitter. In addition, in many cases, it is not known beforehand what interference frequencies will be encountered at the respective place of use, so that the group frequency cannot be determined at the time of constructing the remote control arrangement. It is, therefore, desirable to be able to adjust the group frequency at the place of use in a simple manner, and this need is enhanced where a plurality of similar remote control arrangements are used at the same location or where further remote control arrangements are added to those already in place.

It is the underlying aim of the invention to produce a remote control arrangement for a medical appliance, which by the transmission of a group frequency alternating with the frequency corresponding to the command signal exhibits improved freedom from interference and wherein the group frequency can be modified easily according to individual requirements.

SUMMARY OF THE INVENTION

In the remote control arrangement according to the invention, a number of diodes, corresponding to the number of the inputs of the frequency generator, determines the group code word prescribed in each case. Therefore, in order to choose the group code word or to modify it, a modification of the circuit of these diodes between the outputs of the impulse generator and the inputs of the frequency generator is sufficient. This modification of the circuit can be performed in a simple manner and with a small time delay, even if the diodes are soldered into the circuit.

The diodes are conveniently arranged on or in an exchangeably arranged component block connected to the outputs of the impulse generator on the one hand and to the inputs of the frequency generator on the other hand. This may be, e.g., a module component block which contains the diodes cast in with casting resin and is connected solderably to the remaining circuit of the transmitter or through plug-in contacts to said circuit. A particularly simple solution is for the diodes to be arranged on a plug-in circuit plate.

It has further been found convenient if the diodes generate the group code word at the potentials which appear at the outputs of the impulse transmitter when it is set in operation. Then, when a feed-in key is operated, the group frequency is generated at first, and, thereafter, alternately, the frequency corresponding to the command signal. By this means, the evaluation in the receiver is facilitated compared to the case wherein a frequency signal corresponding to a command signal is transmitted first, and only then the group frequency signal.

The impulse generator is conveniently constructed of a multivibrator, the output of which constitutes the first output of the impulse generator, and an inverter stage following the multivibrator, the output of which constitutes the second output of the impulse generator, complementary to the first output.

It is further desirable if the number of inputs of the frequency generator is smaller than the number of feed-in keys and if a recoder is connected between the feed-in keys and the frequency generator. The code of the code words controlling the frequency generator, including the group code word, then embraces fewer than the n bits of the command signals originally generated by the feed-in keys in the 1-of-n code. Thus, a reduced number of diodes is required to represent the group code word and the structural size of the component block embracing said diodes is reduced. Also, the use of a code without undue redundancy facilitates the construction of the frequency generator, and possibly of the recorder.

It is further desired if the potentials representing the values 0 or 1 of the bits of the code word corresponding to the respective command signal can be fed to the inputs of the frequency generator through resistors. By this means, an overloading of the outputs of the impulse transmitter and possibly of the recoder can be avoided in a simple manner. It is further convenient if the inputs of the frequency generator are connected to a wire matrix. The nodes of said matrix have the resistors connected thereto. Thus, for a given construction of the recoder, different code words and, accordingly, frequency signals can be associated with each command signal generated by a feed-in key, by correspondingly choosing or modifying the position of the nodes in the matrix. It is thus also possible in a simple manner to modify the transmitter as regards the frequency signals according to individual requirements.

It is further convenient if the code, which embraces the code words corresponding to command signals feedable to the inputs of the frequency generator and the additional frequencies which can be generated, is redundant and thus contains at least one unallocated pseudo code word. Then, if a circuit, blocking the generation of frequency signals as a function of the feeding-in of a pseudo code word, is associated with the frequency generator, and if the inputs of the frequency generator are fed by a pseudo code word, then no command signals are present and the impulse generator has not been set in action. The faulty generation of a frequency signal or of a group frequency signal is averted by this means. Also, further conveniently, the pseudo code word which is fed to the inputs of the frequency generator in the state of rest comprises bits of mutually equal values, i.e., has the form 0000 . . . or 1111 . . . , because such a pseudo code word can be represented particularly easily from the electrical standpoint. The representation may be effected in that the potential representing the values of the bits of the pseudo code word consisting of bits of mutually equal values is feedable to the inputs of the frequency generator in each case through a resistor. The resistance value of such resistor is high compared to the feed resistor through which the potential, which represents the value of a bit of the code word corresponding to a command signal, is feedable.

A further development of the remote control arrangement, which is useful for the control of a plurality of medical appliances, each having an associated transmitter and a conjoint receiver, utilizes the fact that the frequency generator of the transmitter can generate a plurality of group frequency signals in each case, only one of which is used. In this specific application, transmitters of identical circuitry technique are used, but the prescribed group code words differ from one another by different wiring of the above-mentioned diodes. Thus, each transmitter generates a group frequency signal peculiar only to itself, whereas the frequency signals corresponding to command signals which can be generated by each transmitter are identical for all transmitters. The conjoint receiver then feeds the command signal obtained from the frequency signal received, as a function of the frequency of the group frequency signal received, exclusively to the appliance associated with the latter. In order to exclude faulty operation in case feed-in keys of two transmitters are actuated simultaneously, the receiver also has a circuit which prevents the emission of command signals in the case of simultaneous reception of at least two group frequency signals.

BRIEF DESCRIPTION OF THE DRAWINGS

The invention is explained more fully hereinbelow with reference to the accompanying drawings, in which a preferred embodiment is illustrated, and wherein.

DETAILED DESCRIPTION OF A PREFERRED EMBODIMENT OF THE INVENTION

Figure 1:
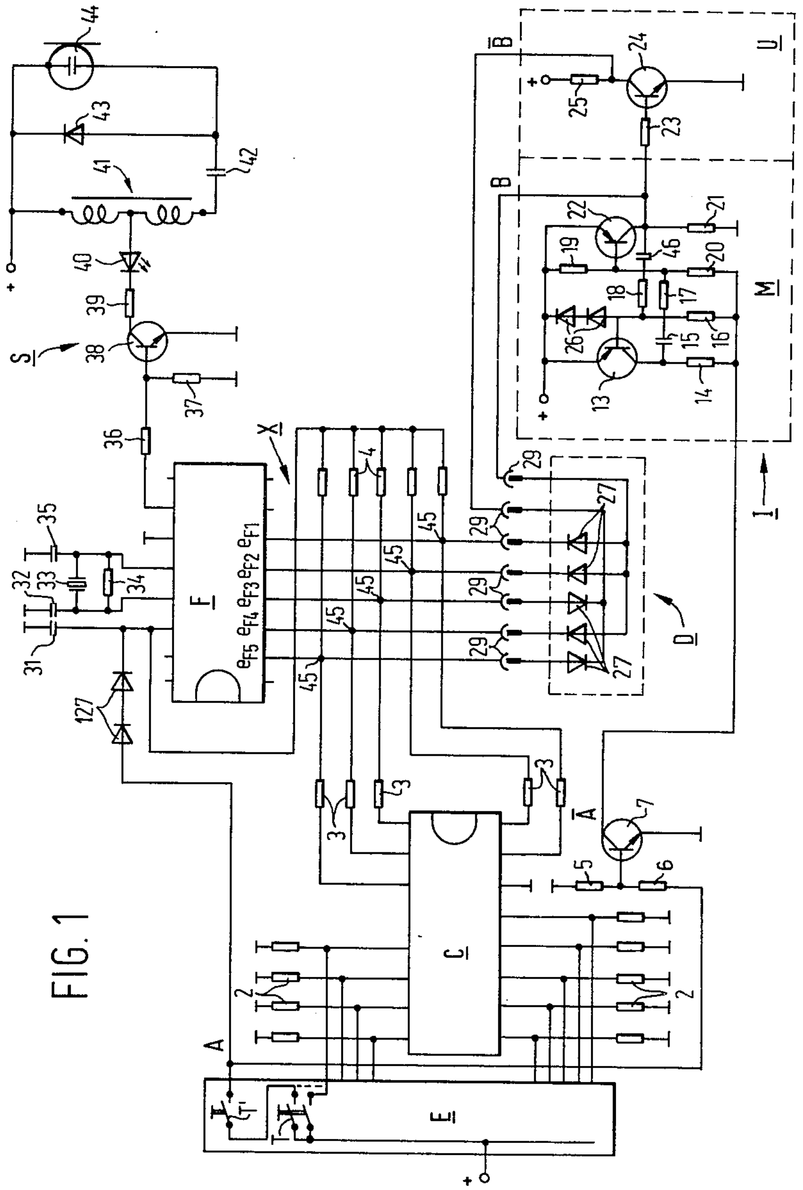
FIG. 1 shows the circuit diagram of the transmitter of the remote control arrangement.

The transmitter illustrated in FIG. 1 has a feed-in keyboard E, a recoder C constructed as an integrated circuit, a transmitting component block F likewise constructed as an integrated circuit, a final stage S with a transmission converter 44, and an impulse transmitter I. The feed-in keyboard E comprises nine feed-in keys T, the number of which corresponds to the number of control commands required to control the appliance, not shown, e.g., an operating table, and also an additional emergency off key, upon actuation of which the receiver (FIG. 2) is switched off. The keys T used may be, e.g., mechanical short-stroke keys or capacitively acting contact keys exhibiting an electronic evaluation circuit. For the sake of simplicity, only one of the feed-in keys T is shown, as mechanically actuable in the exemplary embodiment. Each key T has two simultaneously actuable make contacts, the common pole of which is connected to the positive supply voltage. One make contact of each key T is connected to one of the inputs of the recoder (code converter) C, whereas the remaining make contacts of each of the keys T are connected mutually in parallel to form a group of parallel contacts which are in series with the make contact of an additional key T', through which the positive supply voltage can be fed to the transmitter component block F when both the control T' and any one of the contacts T are closed. Thus, the transmitter commences to operate only upon the simultaneous actuation of a key T and of the additional key T'. There is provided a mechanical interlocking (not shown) of the keys T to prevent simultaneous operation of two or more of the keys T.

Figure 3:
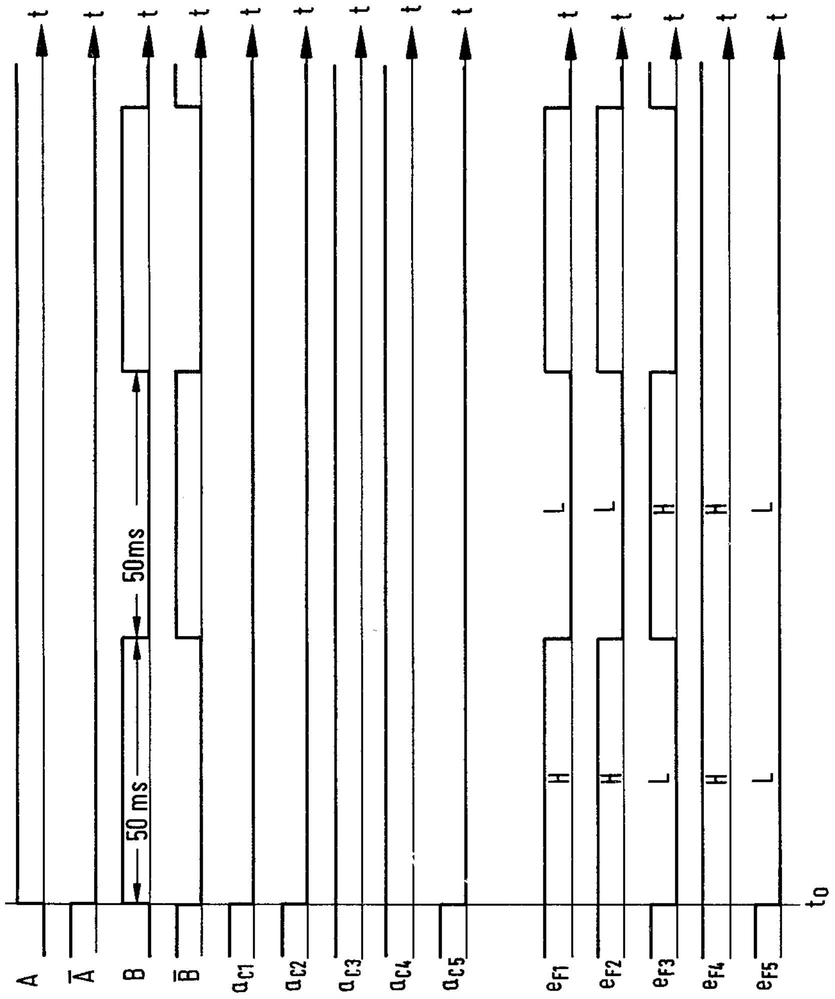
FIG. 3 shows an impulse diagram to explain the principle of operation of the transmitter according to FIG. 1.

The recoder C is realized in CMOS technology and may be, e.g., of the type TMS 3702B available from Texas Instruments. Its inputs are connected to ground, each through a resistor 2, in the absence of a command signal which can be fed in by means of a key T. The actuation of a key T leads to the feeding-in of the command signal in a 1-of-9 code. (In practice, the recoder C has a tenth input, which should likewise be connected through a resistor to ground, and which may be allocated additionally if desired). Although a four-digit code would be sufficient to represent 9 command signals, the recoder C performs a translation into a five-digit binary code in order to enable code words of equal length to be used not only to represent the command signals, but also as additional group code words, and in order to be able to detect errors on the basis of the remaining redundancy. Accordingly, the recoder C exhibits five outputs, which are connected, each through a resistor 3 and a node 45 of a wire matrix X to one of the five inputs $e_{F1}$ to $e_{F5}$ of the transmitter component block F. The recoder C exhibits an output signal controlled by an electronic switch which when actuated connects the output to ground, which corresponds to the value 0 (the level L and also referred to as signal A). When no command signal is provided as inputs to the recorder C, the electronic switches each provide an open circuit. In the case of an erroneous simultaneous application of a plurality of inputs to the recoder C of the positive supply voltage, the level L appears at all of the outputs thereof. Levels L and H are illustrated in FIG. 3.

Those bits of the respective code word which have the value 1 (the level H) are not positively provided by the outputs of the recoder C, because its output switches only interrupts the connection to ground. In order to obtain the level H, the inputs $e_{F1}$ to $e_{F5}$ of the transmitter component block F are fed with the positive supply potential through resistors 4. Thus, in the absence of a command signal, all the inputs $e_{F1}$ to $e_{F5}$ are at the level H, i.e., the code word HHHHH is fed to the transmitter component block F. This is a pseudo code word, causing a circuit contained in the transmitter component block F to operate to prevent the generation of a frequency signal by the frequency generator.

The positive supply potential of the transmitter component block F, which is also supplied to those terminals of the resistors 4 remote from the nodes 45, is reduced with reference to the supply voltage feeding the feed-in keyboard E by means of two diodes 127 poled in the passage direction and is freed of voltage peaks by means of a capacitor 31. The resistance values of the resistors 4 are considerably higher than those of the resistors 3, so that the respective node 45 can be connected with good approximation to ground, which represents the level L when the switch in the corresponding output of the recoder C is closed.

The circuit already mentioned in the transmitter component block F, which prevents the generation of a frequency signal when the code word HHHHH is fed in, is conveniently constructed so that it also renders the emission of a frequency signal impossible when other pseudo code words are fed in. Such a pseudo code word may arise, for example, by a very rapid actuation of two feed-in keys T for short times consecutively, due to the presence of the level L at the output of the recoder C, or in the case of a fault in the recoder C. For example, if a code word corresponding to a command signal reads LHHHH and a code word corresponding to another command signal reads HHHHL, then in the case of a transition from the one corresponding feed-in key T to the other corresponding feed-in key T, the pseudo code word LHHHL will be generated briefly, which, by virtue of the action of the circuit mentioned, does not lead to the emission of an incorrect frequency signal.

The transmitter component block F including the frequency generator and the said circuit which detects pseudo code words may be of type TMS 3835, available from Texas Instruments. Like the recoder C, it is realized in CMOS technology. With it, up to 20 different frequency signals in the ultrasonic frequency range can be generated, which are derived from a primary frequency which can be prescribed by external programming. In the embodiment, an internal oscillator of the frequency generator oscillates at a frequency of 2.97512 MHz, and for the external wiring a quartz crystal 33 and a passive feedback circuit are provided, the latter consisting of capacitors 32, 35 and a resistor 34 to adjust the work point of the oscillator. The primary frequency is divided by means of a seven-stage Johnson counter to the emissible ultrasonic frequencies between 33.3 and 43.7 kHz. The channel interval at 33.4 kHz is approximately 400 Hz and increases to approximately 600 Hz in the case of the highest emissible ultrasonic frequency. Because the absorption of ultrasonic waves by the air increases with increasing frequency, and because the emission of the command signal by the receiver does not ocur if the group frequency signal is not received, the use as group frequency signals of the highest ultrasonic frequency signals which can be generated by means of the frequency generator is advantageous for security reasons. Thus, in the example embodiment, the signal with a frequency of 43.112 kHz is used as a group frequency signal and is emitted by the transmitter component block F when the code word HHLHL is fed into it; the first bit (H) of this group code word is fed to the input $e_{F1}$, and the last bit (L) to the input $e_{F5}$ of the transmitter component block F.

The impulse transmitter I is provided to actuate the transmitter component block F to generate an alternating sequence of two chronologically consecutive frequency impulses, one being the group frequency and the other being the frequency corresponding to the command signal. In the exemplary embodiment, the first frequency impulse which is generated when a feed-in key T is actuated is the group frequency, whereas the next frequency impulse represents the frequency signal corresponding to the command signal. An inverse reference would likewise be reasonable. The impulse transmitter comprises an astable multivibrator M which is turned on by a transistor 7 as a function of the actuation of a feed-in key T and of the additional key T'. The output of the multivibrator M provides a first output of the impulse transmitter I, whereas the output of an invertor stage U provides a second output of the impulse transmitter I, complementary to the first output. The signal B appears at the first output, whereas the second output carries the complementary signal $\overline{B}$.

When a feed-in key T and the additional key T' are actuated, a voltage divider including resistors 5 and 6 to which the transistor 7 is connected by its base is fed with the supply voltage and the transistor 7 is made conductive. It thus connects the input of the multivibrator M to ground. The signal fed to the input of the multivibrator M is complementary to the signal A and is designated $\overline{A}$. Due to the connection of the input of the multivibrator M to ground ($\bar{A}=L$) the multivibrator M commences to operate. Immediately upon this switching-on operation, the transistor 22 is initially conductive and sets the level of the output signal B at H.

In addition to the transistor 22, the multivibrator M has a transistor 13. Their bases are coupled with the other collector 22 or 13 through the series arrangement of a resistor 17 and a capacitor 15 or of a resistor 18 and a capacitor 46. The base of each transistor 13, 22 is further connected through a high resistance 16 or 20 and the transistor 7 to ground. The same applies to the collector of the transistor 13, which is connected through the resistor 14 to the transistor 7, while the collector of the transistor 22 is grounded through a resistor 21. When the transistor 7 is nonconductive, the base of the transistor 22 is connected to the positive supply potential through a resistor 19, while the base of the transistor 13 is connected to the positive supply potential through two diodes 26 connected in series. If a resistor of equal resistance value to the resistor 19 were provided instead of the diodes 26, then when the multivibrator M was switched on the charging of the capacitors 15 and 46 to the steady state values during the first half wave of the imulse series generated by the multivibrator M, (the duration of the group frequency signal impulses) would not be accurate. The diodes 26 accordingly make it possible to observe a definite duration of all the group frequency signal impulses.

The inverter stage U comprises a transistor 24, the base of which is connected through a series resistance 23 to the output of the multivibrator M. The main current path of the transistor 24 is in series with a load resistor 25 between positive supply potential and ground. The output signal $\bar{B}$ is taken from the junction of the load resistor 25 and transistor 24.

Only when the signal B has the level H and the signal $\bar{B}$ therefore has the level L, are these levels, namely one positive potential corresponding approximately to the positive supply potential and one potential corresponding approximately to ground, connectable through correspondingly poled diodes 27 to the inputs $e_{F1}$ to $e_{F5}$ of the transmitter component block F. The diodes 27 are accommodated on a small circuit plate D which is detachably connected by means of plug-in contacts 29 to the two outputs of the impulse transmitter I on the one hand and to the inputs $e_{F1}$ to $e_{F5}$ on the other hand. By exchanging the circuit plate D for other circuit plates with similarly constructed plug-in contacts 29 but differently wired diodes 27, it is possible in a simple manner to modify the group code word prescribed by the wiring of the diodes 27, for which the group signal frequency is generated by the frequency generator.

A explained hereinbefore, the group code word in the exemplary embodiment is HHLHL. In order to feed in the group code word into the transmitter component block F, the diodes 27 connected to the inputs $e_{F1}$, $e_{F2}$, $e_{F4}$ and generating the first, second and fourth bits of the group code word, must be connected to the output of the multivibrator M, because its signal B exhibits the level H immediately after the multivibrator M is switched on. These diodes 27 are wired in the passage direction with respect to the level H, i.e., with respect to the positive supply potential. In corresponding manner, the diodes 27 connected to the inputs $e_{F3}$ and $e_{F5}$ in order to generate the third and fifth bits of the group code word are connected to the output of the inverter stage U and are poled in the passage direction with reference to the ground potential, so that the group code word is fed to bring the inputs $e_{F3}$, $e_{F5}$ approximately to ground potential, i.e., to the level L.

The frequency signal or group frequency signal which can be generated by the transmitter component block F passes through a resistor 36 to the base of an amplifier transistor 38 of the output stage S. The base of the transistor 38 is connected through a resistor 37 to ground, whereas the emitter is connected directly to ground. The collector is connected through a resistor 39 and a light emitting diode 40 to a transducer 41. The light emitting diode 40 arranged on the feed-in keyboard E indicates that the transmitter is in operation. The transducer 41 is connected to the transmission converter 44 through a capacitor 42. A diode 43 is placed in parallel with the transmission converter 44, because the transmission converter 44 constructed as a condenser microphone requires a polarized voltage. A condenser microphone is particularly suitable for the transmission of ultrasonic waves. Since the ultrasonic impulses delivered by the tranmitter component block F are rectangular, the circuit constituted by the transducer 41, the capacitor 42 and the transmission converter 44 contributes to a smoothing in order to suppress undesirable harmonics.

Departing from the exemplary embodiment described, the transmitter may also be constructed for transmitting other electromagnetic waves than ultrasonic waves. The transmission may also be effected more particularly by means of infra-red waves.

Figure 2:
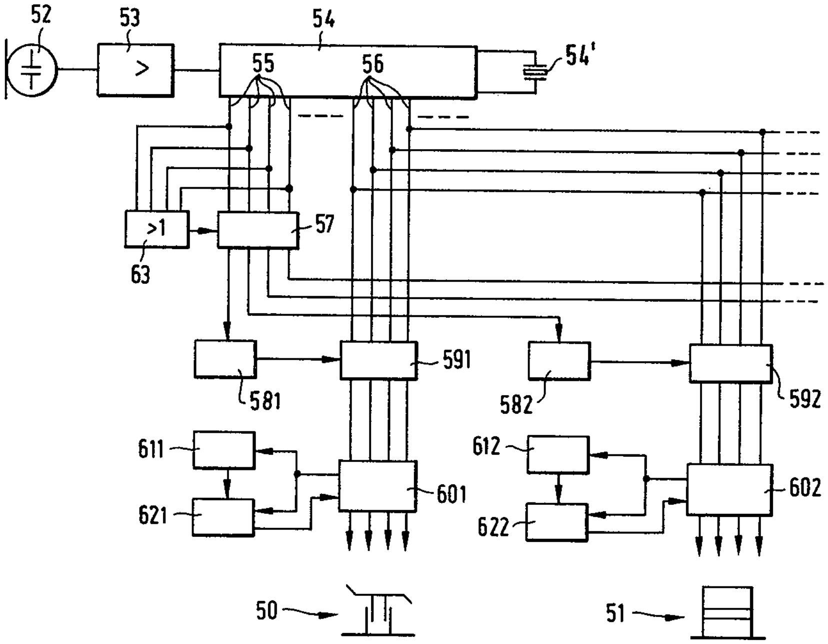
FIG. 2 shows the block circuit diagram of the associated receiver.

The receiver of the remote control arrangement is illustrated as a block circuit diagram in FIG. 2. This is a receiver common to a plurality of applicances and is constructed to receive a number of signals which is at least as great as the highest number of functions to be controlled in an individual appliance plus the number of group frequency signals. The drawing shows, purely symbolically, as appliances to be controlled, an operating table 50 and a patient lock 51 installed in a wall of an operating theater, the latter exhibiting a raisable and lowerable table which is transportable in the horizontal direction into and out of the operating theater and round which an endless belt travels in order to transport a patient lying on the belt at right angles to the wall relatively to the table while the table is stationary.

The receiver has a reception converter 52, a band filter preliminary amplifier 53 following the same, and a receiver component block 54 connected to its output, which is constructed as an integrated circuit, e.g., of type TMS 3700NS, available from Texas Instruments, and which decodes the frequency signals and group frequency signals received. The wiring is not shown in detail except for a ceramic oscillator 54' used as a time reference for the signal identification. At first outputs 55 of the receiver component block 54, signals are obtained which indicate the reception of a group frequency signal in each case. At second outputs 56 of the receiver component block 54, signals appear which indicate the reception of frequency signals corresponding to command signals.

The signals corresponding to the group frequency signals are fed through a gate circuit 57 each to a time-impulse transmitter 581, 582, . . . . The signals at the outputs 56, which indicate the presence of a frequency signal corresponding to a command signal, are fed through gate circuits 591, 592, . . . controlled by the associated time-signal transmitters 581, 582, . . . to one of the number of command emission memories 601, 602, . . . corresponding to the number of the appliances, e.g., 50, 51.

In the presence of a group frequency signal, the corresponding indicator signal transferred through the gate circuit 57 to a time-signal transmitter, e.g., to the time-signal transmitter 581, opens the associated gate circuit, in the example, the gate circuit 591, during a time window which lies chronologically after the reception of the group frequency signal impulse in the second half of the period determined by the impulse transmitter I (FIG. 1). This causes an indicator signal, if present, to pass from an output 56 through the gate circuit 591 to the memory 601. Interference commands which may possibly appear at the end of the transfer process, and brief interruptions of the frequency signal corresponding to the command signal and of the corresponding indicator signal, are keyed out by means of a key-out circuit 611, 612, . . . . Furthermore, an interlocking circuit 621, 622, . . . , which is associated with each memory 601, 602, . . . ensures that every output of the memory which is switched through immediately blocks all the other inputs of the memory during the entire period of the signal transfer operation; only after the release of a feed-in key T (FIG. 1) during a prescribed pause time, can a command signal once more be transferred to the associated appliance and emitted.

In order that no superimposition of the command signals is possible in the case of a simultaneous actuation of two transmitters (FIG. 1) associated with different appliances and with different group signal frequencies, the signals of the outputs 55 indicating the presence of the group frequency signals are fed to a coincidence circuit 63 which emits an output signal when two or more group frequency signals are received simultaneously. The output signal of the coincidence circuit 63 blocks the gate circuit 57, whereby the transfer of the signals from the outputs 55 to the time-signal transmitters 581, 582, . . . is interrupted, the emission of command signals already emitted beforehand is ended and the emission of further command signals is prevented.

The principle of operation of the transmitter according to FIG. 1 will be explained once more hereinbelow with reference to the impulse diagram of FIG. 3. FIG. 3 shows, as a function of the time t, the curve of the signal A obtained at the output of the key T′ (FIG. 1), of the signal $\overline{A}$ conjugate therewith, the first output signal B of the impulse transmitter I and of the second output signal $\overline{B}$ conjugate therewith. The operative state $a_{C1}$ to $a_{C5}$ of the electronic switches provided in the recoder C on the output side, and not further shown, is also illustrated. The level H corresponds to the nonconductive state of the respective switch, because the level H can then develop at the associated node 45, unless the level L is constrained by means of the diode 27. Lastly, FIG. 3 shows the signals at the inputs of the transmitter component block F; these signals are designated by the designation $e_{F1}$ to $e_{F5}$ of the inputs themselves for the sake of simplicity.

In the state of rest, the signals A, B have level L, and the conjugate signals $\overline{A}$, $\overline{B}$ accordingly level H. All the output switches of the recoder C are nonconductive, which is indicated by the level H. All the inputs $e_{F1}$ to $e_{F5}$ of the transmitter component block F are held at the level H by means of the resistors 4, so that the transmitter component block has the pseudo code word HHHHH fed to it.

At a time $t_0$, a feed-in key T and the associated key T′ have been closed, so that the signal A assumes the level H and the conjugate signal $\overline{A}$, the level L. The multivibrator M of the impulse transmitter I commences to switch, while, initially, the first output signal B assumes the level H and the conjugate output signal $\overline{B}$, the level L. After the first half of the oscillation period or pulse repetition time, the level of the first output signal B changes to L and that of the second output signal $\overline{B}$ to H.

From the time $t_0$, the switching states $a_{C1}$ to $a_{C5}$ correspond to the bits of the code word which corresponds to the command signal fed-in by means of the actuating key T. In FIG. 3, this code word is LLHHL, and when this is fed into the transmitter component block F, the latter generates a frequency signal of lower ultrasonic frequency than the group frequency signal. Initially, however, the switching states $a_{C1}$ to $a_{C5}$ are not effective for feeding-in the corresponding code word into the transmitter component block F, because the group code word HHLHL is applied to the inputs $e_{F1}$ to $e_{F5}$ through the diodes 27. For example, in spite of a conductive output of the recoder C connected to the input $e_{F1}$, the input $e_{F1}$ is supplied with the level H corresponding approximately to the positive supply potential, because the input $e_{F1}$ is connected very low, ohmically, to the positive supply potential through the diode 27, the output of the multivibrator M and its conductive transistor 22, while on the other hand, the resistor 3 placed between the input $e_{F1}$ and the associated output of the recoder C. Despite the low resistance values of resistors 3 compared to the resistors 4, the resistor 3 connected to the input $e_{F1}$ exhibits a sufficiently high resistance value not to prevent the imposition of the level H. Thus, the transmitter component block F generates the group frequency signal during the first half of the period of the impulse transmitter I.

During the second half of the impulse time of the impulse transmitter I, the signals B, $\overline{B}$ each assume their conjugate value, i.e., the level of the first output signal B falls to L and that of the second output signal $\overline{B}$ becomes H. All the diodes 27 are in the blocking direction with reference to the potential (approximately ground and approximately positive supply potential) constituting these levels, so that the group code word can now no longer be transferred to the inputs $e_{F1}$ to $e_{F5}$. The code word LLHHL corresponding to the switching states $a_{C1}$ to $a_{C5}$ is, therefore, now adjusted at the inputs $e_{F1}$ to $e_{F5}$, and the corresponding frequency signal is generated.

In corresponding manner, during the next period of the multivibrator M, the group frequency signal at first, and then the frequency signal corresponding to the command signal is generated, and this combination is continued as long as the feed-in key T remains actuated. During the period of actuation, a time-dependent adjustment of an organ of the controlled appliance will occur within a prescribed adjustment range, so that the desired adjustment stroke is obtained depending on the duration of the actuation.

The remote control arrangement described is suitable for any medical appliances, more particularly in hospitals. Besides the control of operating tables and bed-changing devices as indicated in FIG. 2, the remote control arrangement is also more particularly suitable for controlling patient lift devices in medical baths, where a patient supported in a seat suspended from an overhead travelling crane is lifted from the edge of the basin by means of said overhead travelling crane, transported across the bath basin, lowered into the bath basin and set in motion in the basin. An important advantage in this case lies in the fact that the bath attendant or doctor attending the patient can control the required functions in a simple manner while he remains at the edge of the basin or even, if the transmitter is of waterproof construction, remains in the water of the basin in close proximity to the patient. Furthermore, this mode of control which is novel in the case of such patient lift devices affords the possibility to provide further functions. Thus, e.g., a device may be provided including the suspension of the patient's seat from an overhead travelling crane which permits the seat to be twisted mechanically counter to the direction of travel of the crane, in order to be able, while the seat is transported along overhead, to wash the patient with the water pressure which occurs during travel from different directions in order to strengthen different muscle parts, depending upon the direction of the chair.

The remote control arrangement according to the invention is also advantageously useful in other practical applications than the control of medical appliances, more particularly in cases where powerful interference sources have to be taken into account.

What is claimed is:

1. A remote control arrangement for a medical appliance comprising a transmitter and a receiver associated with at least one appliance, said transmitter having a number of feed-in keys corresponding to the number of the functions of the appliance to be controlled, said feed-in keys combined physically to form a feed-in keyboard for feeding-in binary command signals in the 1-of-n code associated with the functions, a frequency generator having a plurality of inputs controllable as to its frequency by the feeding-in of a code word corresponding to the relevant command signal, and switchable on as a function of the presence of a command signal, and a transmission converter fed by the frequency generator and transmitting frequency signals corresponding to the command signals, and an amplifier having a reception converter and means for selective amplification of the frequency signal received and of their reconversion into the command signals, and said frequency generator being constructed to generate a group frequency signal in addition to the frequency signals corresponding to the command signals as a function of the feeding-in of an additional group code word, said transmitter having an impulse generator which can be set in action as a function of the appearance of a command signal, said impulse generator generating output impulses whereby the group code word can be fed into the frequency generator instead of the code word corresponding to the relevant command signal, and said receiver having a circuit which controls the emission of the command signals as a function of the alternate reception of a frequency signal corresponding to a command signal and of the group frequency signal, said frequency generator being constructed to generate a plurality of additional group frequency signals as a function of the feeding-in of one at a time of a corresponding number of different group code words, said impulse generator having two complementary outputs, and the inputs of said frequency generator being connected each through a diode to an output of the impulse generator so that in a prescribed switching state of the impulse generator the potentials corresponding to the binary values appearing at its outputs are connectable through all the diodes poled in the passage direction with reference to the respective potential in accordance with the respective bits of a prescribed group code word to the inputs of said frequency generator.

2. A remote control arrangement according to claim 1, wherein the diodes are connected to the outputs of the impulse generator and to the inputs of the frequency generator.

3. A remote control arrangement according to claim 1 or 2, wherein the diodes generate a group code word in the signal states appearing at the outputs of the impulse transmitter.

4. A remote control arrangement according to claim 1, wherein the impulse generator comprises a multivibrator, the output of which constitutes the first output of the impulse generator, and an invertor stage following the multivibrator, the output of said invention stage being the second output of the impulse generator complementary to the first output.

5. A remote control arrangement according to claim 1, wherein the number of the inputs of the frequency generator is smaller than the number of the feed-in keys and a code translator connected between said feed-in keys and said frequency generator.

6. A remote control arrangement according to claim 1, wherein the potential signals representing the values of the bits of the code word corresponding to the respective command signal are feedable to the inputs of said frequency generator through resistors.

7. A remote control arrangement according to claim 6, wherein, said inputs of said frequency generator are connected to a wire matrix, to the nodes of said matrix are connected to resistors.

8. A remote control arrangement according to claim 1, wherein the code which embraces said code words corresponding to the command signals feedable to the inputs of the frequency generator and the group code words corresponding to the additional frequencies which can be generated contain at least one unallocated pseudo code word, a blocking circuit, associated with said frequency generator, for blocking the generation of frequency signals as a function of the feeding-in of a pseudo code word, the inputs of said frequency generator being fed with a pseudo code word when no command signals and no group code words are present.

9. A remote control arrangement according to claim 8, wherein said pseudo code word which feeds the inputs of the frequency generator in the absence of command signals and of group code words consists of bits of equal values among themselves.

10. A remote control arrangement according to claim 9, wherein the potential representing the values of the bits of said pseudo code word constituted by bits of equal value among themselves is feedable to the inputs of said frequency generator in each case through a resistor, the resistance value of each of said resistors being high compared to the resistor through which the potential is feedable which represents the value of a bit of the code word corresponding to a command signal.

11. A remote control arrangement according to claim 1, for a plurality of medical appliances each with an associated transmitter and with a common receiver, wherein the prescribed group code words of the transmitters differ among themselves, said receiver feeding the command signal obtained from a received frequency signal as a function of the frequency of the group frequency signal received exclusively to the appliance associated therewith and said receiver having a circuit which prevents the output of command signals in the case of simultaneous reception of at least two group frequency signals.

* * * * *